US008261551B2

(12) United States Patent
Brewington

(10) Patent No.: US 8,261,551 B2
(45) Date of Patent: Sep. 11, 2012

(54) ENERGY PRODUCING DEVICE

(76) Inventor: Doyle Brewington, Northampton Spring, TX (US)

(*) Notice: Subject to any disclaimer, the term of this patent is extended or adjusted under 35 U.S.C. 154(b) by 0 days.

(21) Appl. No.: 12/892,382

(22) Filed: Sep. 28, 2010

(65) Prior Publication Data

US 2011/0139431 A1 Jun. 16, 2011

(51) Int. Cl.
*F01K 27/00* (2006.01)
*F03G 7/00* (2006.01)
*F24J 3/08* (2006.01)

(52) U.S. Cl. .............. 60/641.2; 60/641.1; 60/641.4; 165/45

(58) Field of Classification Search ...... 60/641.1–641.4; 62/260; 165/45; 122/31.1, 250 S, 118, 132
See application file for complete search history.

(56) References Cited

U.S. PATENT DOCUMENTS

| | | | |
|---|---|---|---|
| 3,274,769 A * | 9/1966 | Reynolds | 60/641.2 |
| 3,638,720 A | 2/1972 | Thomas | |
| 3,755,076 A | 8/1973 | Lindsley | |
| 3,824,793 A * | 7/1974 | Matthews | 60/641.4 |
| 3,827,243 A | 8/1974 | Paull et al. | |
| 3,938,334 A | 2/1976 | Matthews | |
| 3,938,335 A | 2/1976 | Marwick | |
| 3,974,394 A | 8/1976 | Bailey | |
| 3,986,362 A | 10/1976 | Baciu | |
| 3,988,896 A | 11/1976 | Matthews | |
| 4,023,136 A | 5/1977 | Lamensdorf et al. | |
| 4,100,744 A | 7/1978 | De Munari | |
| 4,107,987 A | 8/1978 | Robbins et al. | |
| 4,144,715 A | 3/1979 | Fleck et al. | |
| 4,285,401 A | 8/1981 | Erickson | |
| 4,291,232 A | 9/1981 | Cardone et al. | |
| 4,372,386 A | 2/1983 | Rhoades et al. | |
| 4,380,903 A | 4/1983 | Matthews | |
| 4,386,499 A | 6/1983 | Raviv et al. | |
| 4,407,126 A | 10/1983 | Aplene | |
| 4,741,388 A * | 5/1988 | Kuroiwa | 165/45 |
| 4,893,672 A * | 1/1990 | Bader | 165/163 |
| 4,896,725 A | 1/1990 | Parker et al. | |
| 4,899,534 A | 2/1990 | Sorenson | |
| 4,912,941 A | 4/1990 | Buchi | |
| 5,058,386 A | 10/1991 | Senanayake | |
| 5,099,648 A | 3/1992 | Angle | |
| 5,513,573 A | 5/1996 | Sutton | |
| 5,623,986 A * | 4/1997 | Wiggs | 165/45 |
| 5,816,314 A * | 10/1998 | Wiggs et al. | 165/45 |
| 6,259,165 B1 * | 7/2001 | Brewington | 290/1 A |
| 7,013,645 B2 | 3/2006 | Brewington | |

FOREIGN PATENT DOCUMENTS

| | | |
|---|---|---|
| DE | 498700 | 5/1930 |
| DE | 2918001 | 11/1980 |
| FR | 2520448 | 1/1982 |

* cited by examiner

*Primary Examiner* — Thomas Denion
*Assistant Examiner* — Christopher Jetton
(74) *Attorney, Agent, or Firm* — KED & Associates, LLP

(57) ABSTRACT

An energy producing device is provided that includes a heat exchanger section to provide a heat exchange material, and a thermal riser to receive the heat exchange material from the heat exchange section and to heat the heat exchange material based on a down-hole resource. The thermal riser may include: an outer spiral pipe to circulate the heat exchange material in a downward manner, and an inner return pipe provided inside the outer spiral pipe to receive the heat exchange material from the outer pipe after passing through the spiral pipe.

19 Claims, 9 Drawing Sheets

ENERGY PRODUCING DEVICE

BACKGROUND

Field

Embodiments of the present invention may relate to electrical power generation from suspended or new down hole oil, gas or water wells in which a heat energy resource may be viably extractable using a thermal riser (or a compound thermal riser). The heat energy resource may then be converted into electricity or other forms of energy.

BRIEF DESCRIPTION OF DRAWINGS

Arrangements and/or embodiments may be described in detail with reference to the following drawings in which like reference numerals refer to like elements and wherein.

DETAILED DESCRIPTION

Figure 1:
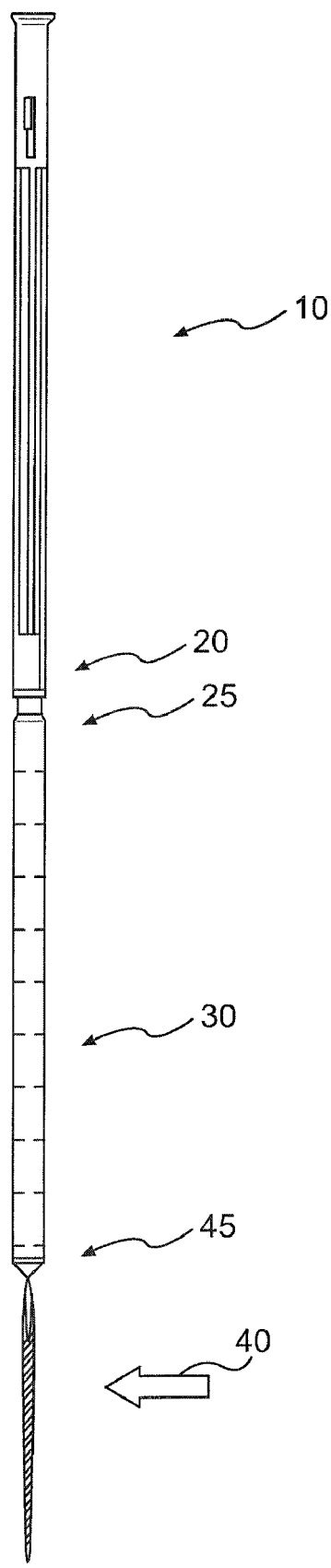
FIG. 1 is a view of a geomagmatic energy producing (or Power Tube) device that includes a thermal riser.

Embodiments of the present invention may provide an apparatus and method for extraction of heat energy from down hole perforations or abandoned oil and gas or hot water wells.

Embodiments of the present invention may utilize new or abandoned resources such as oil or gas wells or newly perforated wells that may reach geomagmatic areas containing sufficient heat energy, either dry heat or wet heat, that may be extracted and converted through a spiral design of a thermal riser (also referred to as a compound thermal riser).

Embodiments of the present invention may be designed with integrated systems (or modules) that may provide for placement of a compound thermal riser in a selected thermal resource. As one example, the compound thermal riser may include five (5) integrated systems (or modules). Other numbers of integrated systems may also be provided. Once provided in the selected resource, the compound thermal riser may be filled with a heat transfer material that begins to circulate downward through an outer spiral pipe. Heat contained in the down hole resource (either wet or dry) may be transferred into the spiral tube and then into the heat transfer material that is pumped in a closed loop circuit (or stream) to a surface through a center pipe to the area requiring the heat.

Embodiments of the present invention may provide for return of the heated transfer material through a closed loop circuit (or stream) that may also provide for the heat transfer material to flow through a dual dichotomized venturi system at a bottom or a return point where the spiral tube meets a vertical return tube. The system may eliminate formation of bubbles in the circulating heat transfer material thus allowing efficiency in the returning heat transfer material.

Embodiments of the present invention may allow for a heat transfer pump (or circulating pump) to circulate the heat transfer material. The pump may be of a variable speed, and the variable speeds may be controlled through a series of sensors that may serve to test the temperature of the circulating heat transfer material at given points along the path of circulation and temperature information may be sent to a controlling computer such as a Programmable Logic Controller (PLC) that may speed up or slow down a speed (RPM) of the circulating pump to balance the required flow in order to maintain the required temperature of the heat transfer material. The circulating pump may be attached to the system on the surface and/or may be provided within the circulating material containment structure of the compound thermal riser. Sensors (or sensor unit) may be provided throughout in order to control a speed of the circulating pump that may be controlled when interfaced with a Programmable Logic Controller (PLC). The sensors (or sensor unit) may be located in the compound thermal riser assembly, singly or multiple cascade, within the assembled structure.

A structure of an outer spiral pipe may be constructed to be processed through a high temperature dual extrusion method process that may allow for elimination of ribbed formations that form when a tube is formed into a spiral pipe. Thus, an inside diameter (ID) ribbing that forms due to a decrease of the inside diameter area may be eliminated from the final product. Elimination of the inside diameter ribs may allow for smoother flow of the heat transfer material and thus a lower electrical power requirement for the circulating pump and an increase in efficiency of flow for the heat transfer material.

The heat transfer material may be liquid, dry powdered and/or a mineralized compound.

The circulating heat transfer material may be used to exchange thermal energy with any device that requires transfer of heat other than for electrical power generating devices such as to heat water.

The materials may be made of any metal or compound that will withstand a variety of detrimental elements or temperatures that may be found in a well or a down hole to be used for thermal energy extraction by the compound thermal riser.

As used herein, embodiments may be described with respect to pipes. These pipes may also be considered to be tubes and/or conduits.

FIG. 1 is a view of a geomagmatic energy producing (or Power Tube) device that includes a compound thermal riser according to an example embodiment of the present invention. Other embodiments and configurations are also within the scope of the present invention. The geomagmatic energy producing (or Power Tube) device may be described in U.S. Pat. No. 6,259,165, the subject matter of which is incorporated herein by reference. The compound thermal riser may be considered as part of the Power Tube or as a separate element to be attached to the Power Tube.

As one example, the Power Tube device (or energy producing device) may include a condensing section 10 (or condenser module), a Monocoque turbo-generator section 20 (or turbine section), a heat exchanger section 30 and a compound thermal riser 40. The condensing section 10 may convert (or revert) gases to liquids. FIG. 1 also shows a flange 25 that couples the Monocoque turbo-generator section 20 to the heat exchanger section 30. FIG. 1 also shows a thermal riser pump housing 45. The Monocoque turbo-generator section 20 may also be called a turbine or a generator. The turbine or the generator may provide electricity based on heated heat exchange material.

The Monocoque turbo-generator section 20 may be driven by gasses produced in the heat exchanger section 30. The heat exchanger section 30 may be bathed in heat exchange material sent up by the compound thermal riser 40.

Figure 2:
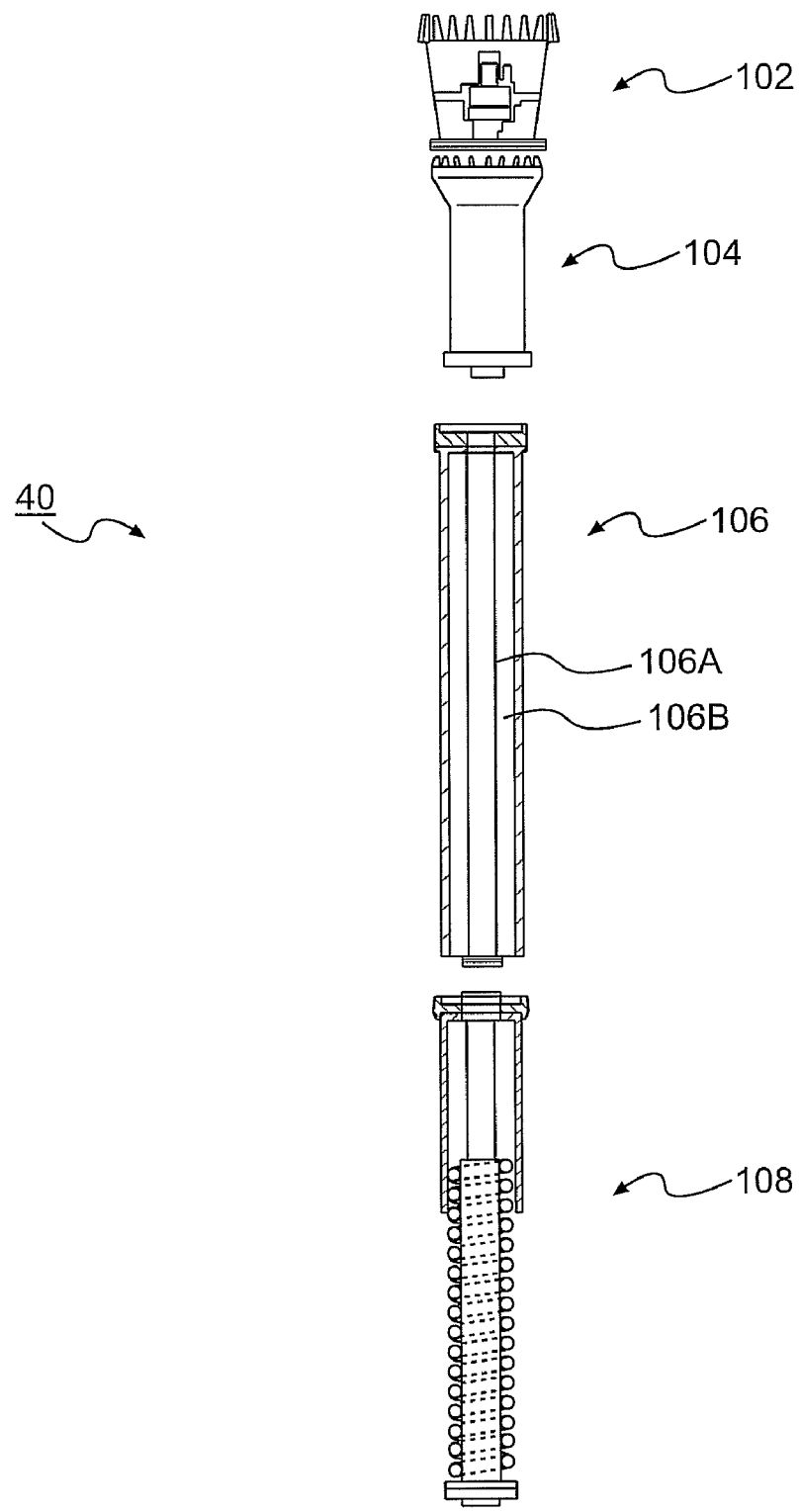
FIG. 2 is a view of components of a thermal riser according to an example embodiment of the present invention.
Figure 3:
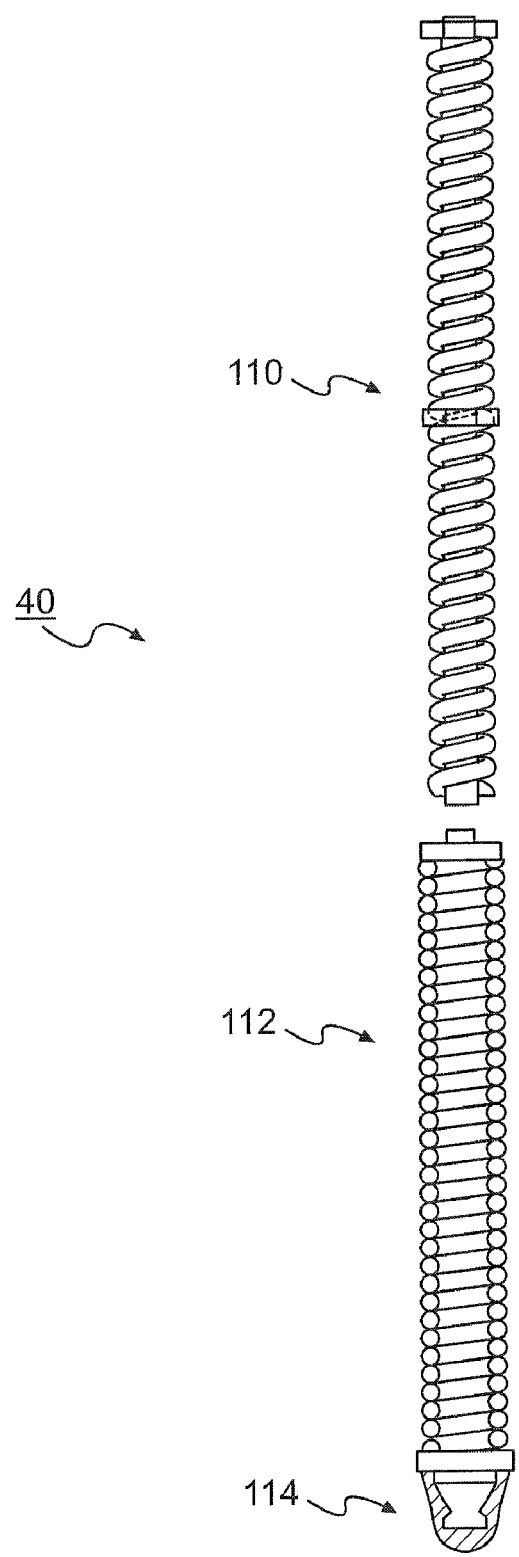
FIG. 3 is a view of components of a thermal riser according to an example embodiment of the present invention.

FIG. 2 is a view of components of a thermal riser according to an example embodiment of the present invention. FIG. 2 shows a pump housing of the thermal riser 40. FIG. 3 is a view of further components of a thermal riser according to an example embodiment of the present invention. The elements shown in FIG. 3 may be coupled to the elements shown in FIG. 2 to form the compound thermal riser 40. Other embodiments and configurations are also within the scope of the present invention.

The thermal riser 40 may include a thermal riser pump housing 102 (or pump and housing unit), a thermal riser system transitional coaxial adapter 104 (or first stage adapter), a thermal riser section 106 and a thermal riser transitional (coaxial to spiral type) section 108.

The thermal riser pump housing 102 may attach to a resource of the heat transfer material. The thermal riser system transitional coaxial adapter 104 may be coupled between the thermal riser pump housing 102 and the thermal riser coaxial section 106.

The thermal riser coaxial section 106 may have an outer area 106A for down flow and an inner pipe 1068 for return flow. The thermal riser coaxial section 106 may be used above a heat zone at a start geomagmatic resource level. As one example, the thermal riser coaxial section 106 may be 8 feet in length. Other lengths may also be provided.

The thermal riser transitional section 108 may transition from a coaxial system at an upper section to a spiral system at a lower section. The thermal riser transitional section 108 may be provided at a beginning of the geomagmatic resource and may continue to have a same geometry until it mates with a final return unit at an end of the spiral pipe sections.

As shown in FIG. 3, the thermal riser 40 may include spiral pipe sections 110, a return flow spiral final pipe 112 and an anti-foam/anti-bubble return casing unit 114. The spiral pipe sections 110 may also be considered spiral tube sections.

FIG. 3 shows two spiral pipe sections 110, with each pipe section being twist lock joined, compressing a pressure gasket as a center pipe and a spiral pipe unit lock into a next identical unit. As one example, each pipe section may be 20 feet. Other lengths of the pipe sections may also be provided. The spiral pipe sections 110 may be joined by dual threaded joints, with one on the inside pipe and one on the spiral head matrix section.

The return flow spiral flow pipe 112 (or tube) may contain a double venturi design that does not permit return fluid inside the pipe to foam at the turn.

The return flow spiral flow pipe 112 may be provided at an end of the thermal riser installation. It may contain two sets of sensors. One set of sensors may be for a spiral pipe side recording temperature. This may be a same type of sensor as found on the straight return pipe. The other set of sensors may relate to flow, with one sensor on the spiral pipe side and the other sensor on the return pipe side.

The anti-foam/anti-bubble return casing unit 114 may also contain a series of sensors relating to heat, flow and pressure. The sensors may inform the PLC of a temperature of the surrounding resource, thus speeding up or slowing down an RPM of the circulating pump (or heat transfer material pump) to keep in sync with heat derived from the resource.

Figure 4:
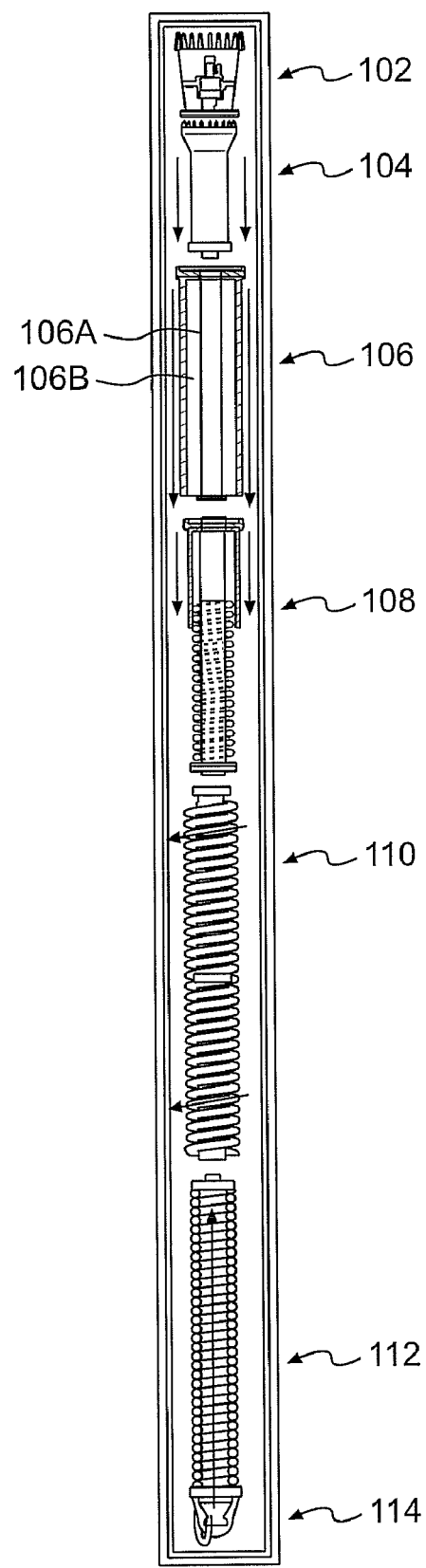
FIG. 4 shows a thermal heat riser assembly according to an example embodiment.

FIG. 4 shows a thermal heat riser assembly according to an example embodiment of the present invention. Other embodiments and configurations are also within the scope of the present invention. The arrows show the downward path of the lower temperature heat exchange material, and the arrows show the return path of the now heated heat transfer materials.

As shown in FIG. 4, the thermal riser pump housing 102 attaches to a base of the heat exchanger section 30. FIG. 4 then shows the thermal riser transitional coaxial adapter 104 to provide a coaxial flow of the heat exchanger material. The thermal riser coaxial section 106 provides a coaxial flow that is used until a point (or depth) where geothermal resource required heat is reached. The thermal riser transitional section 108 provides a coaxial flow transition to a spiral flow at a start of the geomagmatic heat zone.

The two spiral pipe sections 110 provide two 20 ft. sections, for example. These may be spiral heat transfer units of the thermal riser that are located for the full length of the geomagmatic heat zone. The heat transfer fluid (or material) may flow downward absorbing (or picking up) heat along the side of the spiral pipe.

The return flow spiral flow pipe 112 is the final section that contains sensors. The heat exchanger fluid (or material) may be sent back up from this section to the heat exchanger section 30. The anti-foam/anti-bubble return casing unit 114 may be the tip of the end unit containing anti-foam and anti-bubble valving and the sensors that control the pump speed.

Figure 5:
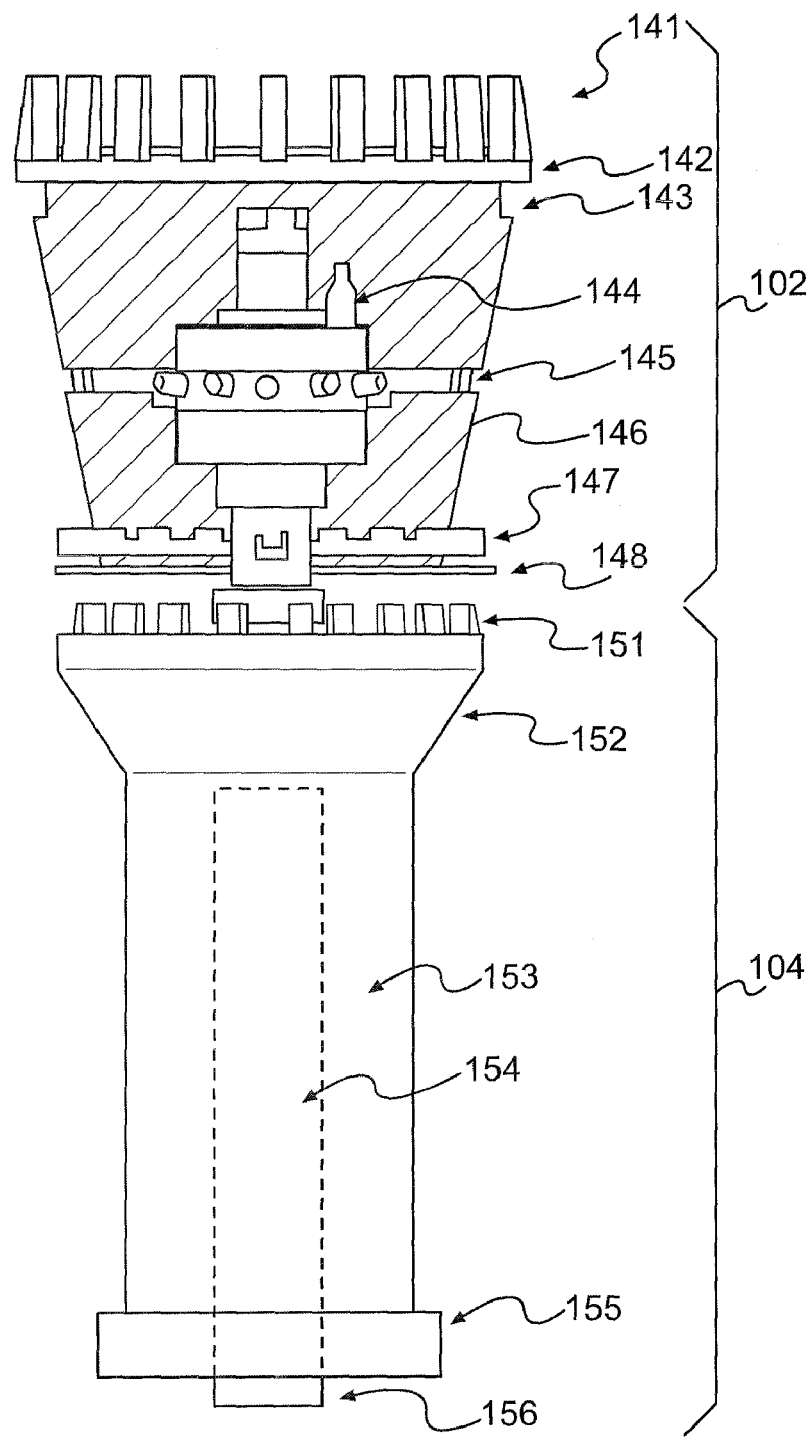
FIG. 5 shows a pump housing, a pump and a coaxial lower converter pipe.

FIG. 5 shows a pump housing, a pump and a coaxial lower converter pipe. FIG. 5 may also show a material containment bowl that may contain material to be circulated and may also show an exemplar submersible, variable speed, in-line circulation pump. The device to which the heat is going to be transferred may also be connected. This section may also contain a set of temperature, pressure and flow sensors.

FIG. 5 may also show a coaxial tube system adapter that may be used to store and transfer the heat transfer material from the first segment pump system, which may be transferred to the second straight adaptive coaxial tubular flow section. This may allow for interfacing of one segment to another segment that may change geometry of the flow of the heat transfer material. This unit may also contain a set of heat, flow, temperature and pressure sensors controlled by a Programmable Logic Controller.

FIG. 5 is an exploded view of the thermal riser pump housing 102 and the thermal riser system transitional coaxial adapter 104 (from FIG. 2). As shown in FIG. 5, the thermal riser pump housing unit 102 may include locking bolts (male) 141 that hold the casing to the heat exchanger section 30, a pressure sealing gasket 142, a casing guide support 143 (or containment housing), a cable connection to power pump 144 (or power controller), a heat transfer pump 145, a pump housing casing 146, a lower flange bolt plate 147 (or locking bolt plate) and a gasket seal 148. The heat transfer pump 145 may also be considered a variable speed, in-line circulation pump.

As shown in FIG. 5, the thermal riser system transitional adapter 104 may include latching bolts 151 (or power adapters (joiners)) to the pump housing casing 146, a beveled connecter flange 152 (of a stabilizer section housing), an outer casing 153 of the coaxial section (or down flow area), a return pipe 154 of the coaxial section (or upward return flow pipe), a locking flange 155 (or bevel) of the coaxial segment and a return pipe threaded section 156.

Embodiments may also include a double threaded screw attachment of one heat material transfer containing a coaxial pipe device unto the other except for units that are bolted together. Each segmental unit may contain a series of special gaskets that impede escape of the heat transferring material by being proper tightening together.

Figure 6:
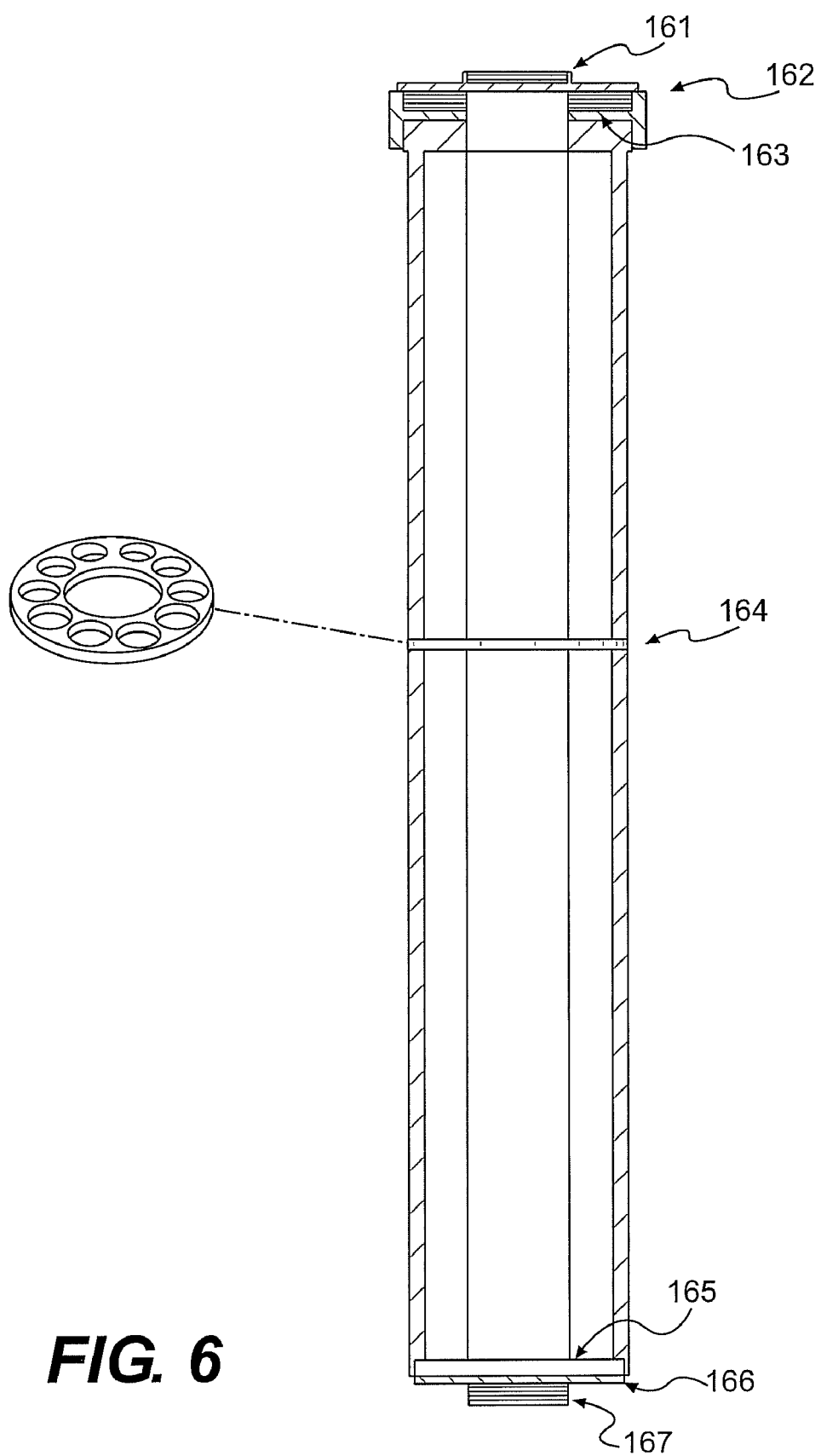
FIG. 6 shows a straight coaxial pipe section or an exploded view of a thermal riser coaxial pipe section (FIG. 2)

FIG. 6 shows a lineal flow section with end attachments that screw onto each other. Segments may be supplied in any length and any size as required for any given installation. The sections as shown may be used to cover a distance down to the hot or geomagmatic zone from where the spiral coaxial units segments may be further attached for the purpose of not needing more expensive spiral units until the geomagmatic area is reached and the heat transfer material therefore may remain a much longer time in the geomagmatic area decreasing heat loss while increasing greater thermal efficiency on the return cycle.

FIG. 6 shows a straight coaxial pipe section or an exploded view of the thermal riser coaxial section 106 from FIG. 2. As shown in FIG. 6, the thermal riser coaxial section 106 may include a return pipe threaded portion 161 of the inner coaxial pipe, a threaded portion 162 of the outer coaxial pipe (or sealing gaskets), a beveled support 163 (or male threading plenum) between the outer and inner coaxial pipes, a (middle section) stabilizer (or separator) 164 showing flow rings in the separator flange, a lower beveled support 165 (or female threading plenum) for outer and inner coaxial pipes, a sealing gasket 166 and a threaded section 167 of the return coaxial pipe. FIG. 6 also shows a perspective view of the stabilizer 164.

Figure 7:
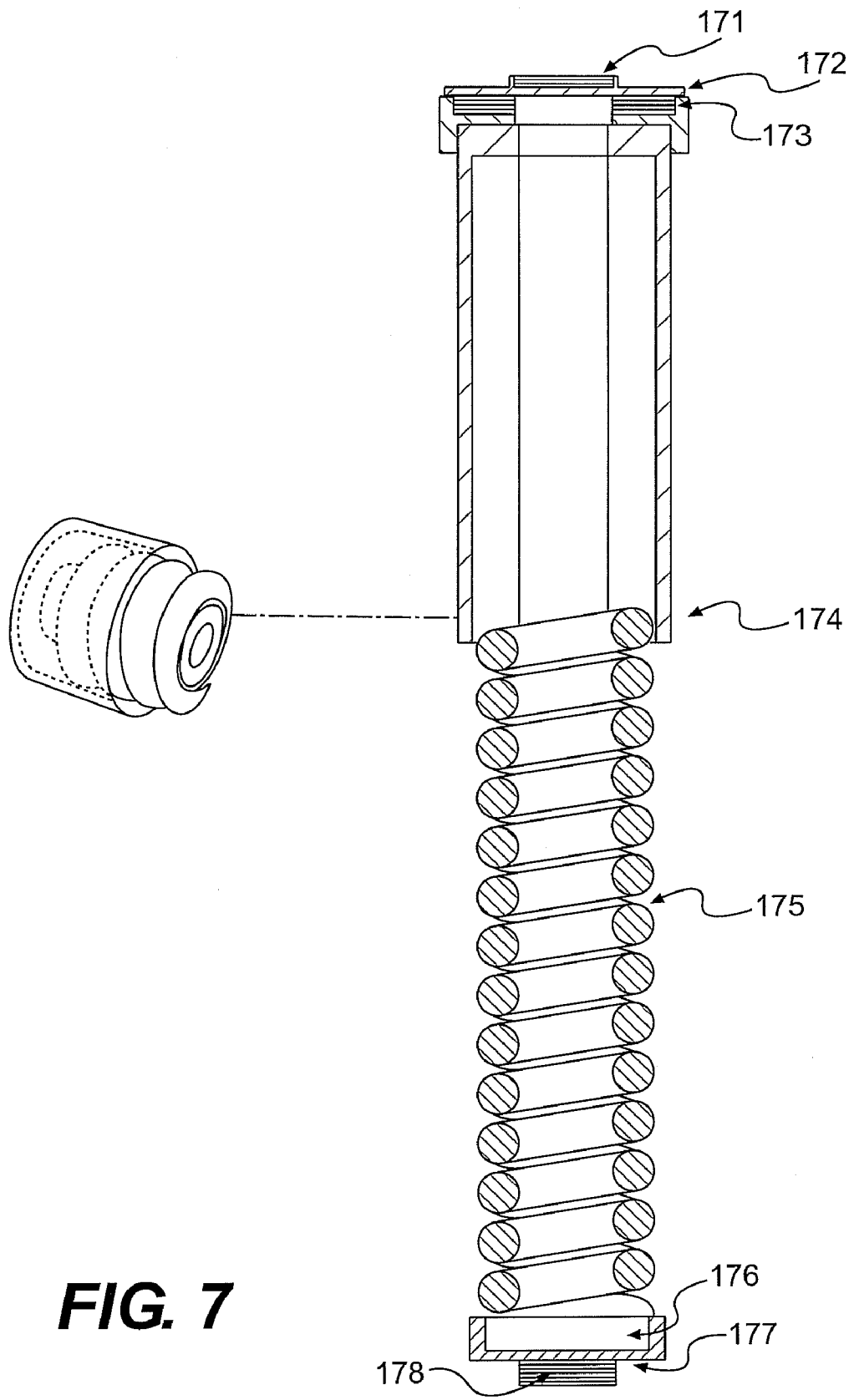
FIG. 7 shows a thermal riser transitional section (FIG. 2)

FIG. 7 is an exploded view of the thermal riser transitional section 108 (from FIG. 2). FIG. 7 shows the transitional segment from coaxial to spiral. As shown in FIG. 7, the thermal riser transitional section 108 may include a return pipe up flow threaded section 171, a threaded section 172 (or sealing gaskets) for the outer pipe assembly, a gasket seal 173 for an upper section of the outer pipe assembly, a converter exchange device 174 (or flow direction exchange interface unit) where the pipe becomes spiral instead of coaxial (or a straight to spiral converter), an outer spiral pipe section 175 (or a beginning spiral segment) of a lower half of the converter, an inner thread housing 176 (or a female threading plenum) for a lower converter section of pipe, a lower high pressure gasket 177, and a threading 178 for a pipe lower section. FIG. 7 also shows a perspective view of the converter exchange device 174.

The converter exchange device 174 may convert the straight flow coaxial method to the coaxial spiral flow method. The converter exchange device 174 may be normally found at a level where desirable geomagmatic temperature begins to materialize, which may permit a flow of a greater volume of heat transfer material to remain in the geomagmatic zone for a longer period of time increasing efficiency and minimizing return volume temperature loss. Different surface thermal requirements may require that diameter sizes of the compound thermal risers may be used for effective and efficient operation.

Figure 8:
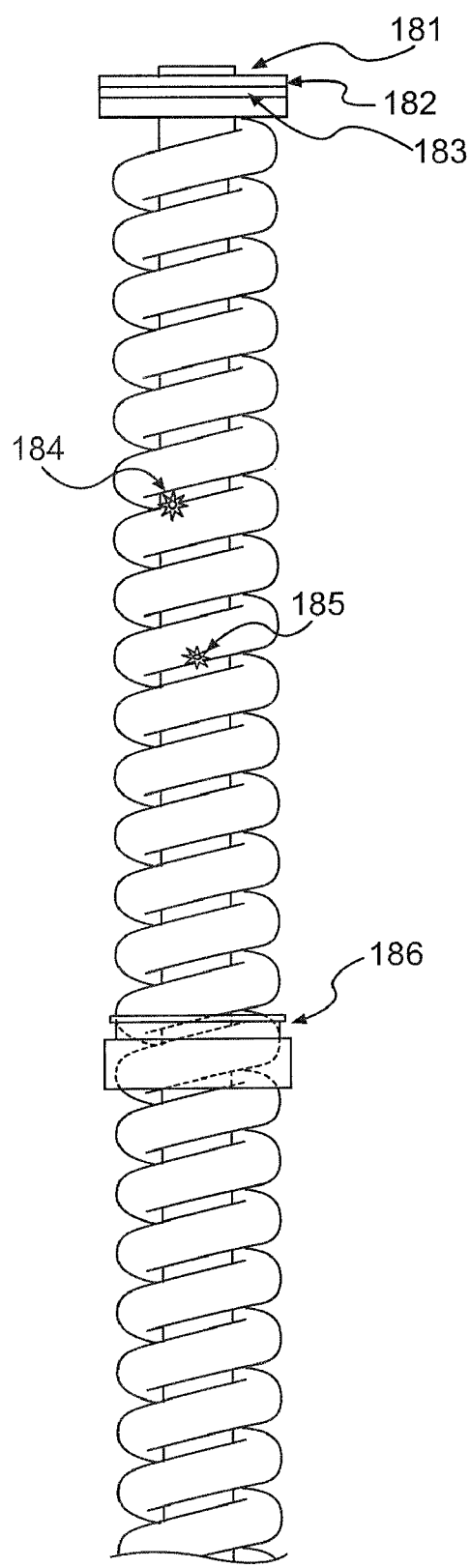
FIG. 8 shows spiral pipe sections (FIG. 3)

FIG. 8 is a vertical view of two spiral pipes (or segments) joined together. Each pipe (or section) may be 20 feet, for example. The spiral pipes (or tubes) may be joined by a threaded male to female coupling while the return straight center pipes may be joined by threaded female to male coupling with heavy duty gaskets in between. The heavy duty threaded system may permit a vertical weight of each segment to sustain the unit below. A gauge of the material used may determine the amount of sections that may be provided together in a self sustaining chain.

More specifically, FIG. 8 is an exploded view of the spiral pipe section 110 from FIG. 3. As shown in FIG. 8, the spiral pipe section 110 may include a return pipe threads 181, an inner gasket seal 182 (or sealing gasket) for the spiral section, an outer spiral secure flange 183, a thermal sensor 184 for downward spiral flow, a thermal sensor 185 for upward flow, and a joining section gasket seal 186 having both ends threaded on the spiral side and on the straight pipe side.

Figure 9:
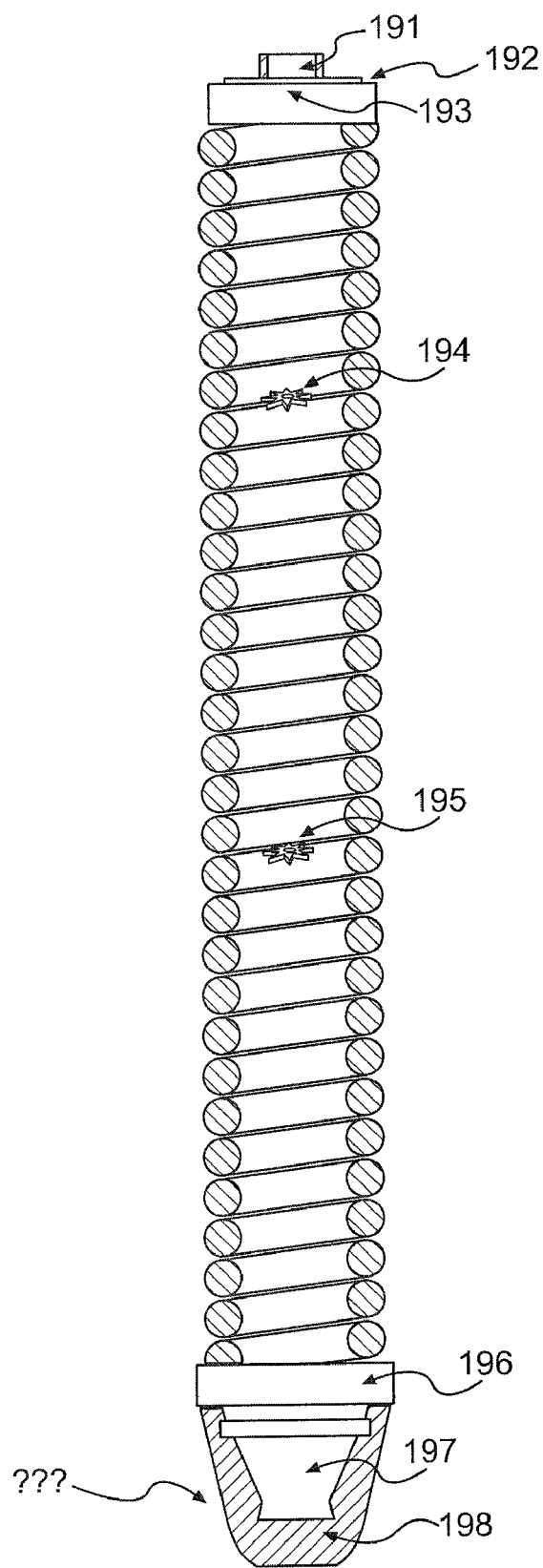
FIG. 9 shows a return flow spiral final pipe.

FIG. 9 shows a flow return unit to complete the circuit in which the heat transfer material flows. Due to abrupt reversal of the flow from a downward flow to an upward flow, the heat transfer material may foam when at a final point of gravitational suspension where the reversing takes place. This may be problematic in that efficiency of the system may be degraded by introducing bubbles into the return flow. As such, a special double reversing venturi system may be part of the end cone material flow reversing structure.

FIG. 9 also includes system sensors (or sensor units) that report back to the Programmable Logic Controller (PLC). Two sensors may be provided on the downward side of the flow, one sensor may be provided for temperature, the other sensor may be provided for pressure. Additionally, two sensors may be provided on the upward side of the flow, and another sensor may be a flow sensor located on the return side of the double venturi reversing system. A seismic sensor may be provided along the entire length of the compound thermal riser.

More specifically, FIG. 9 is an exploded view of the return flow spiral final pipe 112 and the anti-foam/anti-bubble return casing unit 114 (from FIG. 3). The return flow spiral final pipe 112 may include a return pipe threading 191, a sealer gasket 192 for the spiral section of pipe, a threaded spiral section 193 of pipe, a return pipe flow sensor 194, a return pipe heat sensor 195, the reverse flow connector plate and gaskets 196, a reverse flow valve and sensor housing 197. The sensor unit may also include the primary heat sensor 198 for a reverse flow housing.

The use of spiral tubing may provide advantages such as: the heat exchange fluid (or material) remains in the thermal zone for a greater period of time providing an increase in 25%-35% efficiency. The spiral pipe in a given area may contain 8 times the fluid in a similarly given area in a coaxial thermal riser. The design of the spiral thermal riser may provide that the return inner pipe be 12% smaller in diameter than the diameter of the spiral pipe, thus enabling an increase of speed in the return of the heat exchange fluid (or material) to the heat exchanger section 30. This may minimize heat loss. The base design of the thermal riser may allow for seating of the pump housing casing to rest on a concrete base that supports its weight and conforms to the sealing base.

The pumping system may be tied together through a series of sensors to the Programmable Logic Controller (PLC). The PLC in receiving the signals from the sensors in the thermal riser may increase or decrease the speed of the pump in accordance with the sensors relay to the PLC.

Earth geomagmatic conditions may not always run at a same temperature. Therefore, if there is a temperature drop in the resource, the PLC may inform the circulating pump to slow down thus enabling the heat transferred to the heat exchange material be provided at an increased level of BTU's in order to stay within an operational format of the entire system. If the heat flow increases, then information from the sensors may be "it's getting hotter down here." The PLC may react by increasing a speed of the flow of the heat exchange material so that it absorbs less of the heat in passing and therefore stays within operational parameters.

Additionally, heat transfer from the surrounding area into the heat exchanger section through the thermal riser may be controlled by sensors in the riser that indicate to the PLC, the changes of temperature in the surrounding environment allowing for regulation of speed of the heat transfer pump to speed up or slow down in accordance with a temperature that maximizes (or increases) efficiency of the turbine of the Monocoque turbo-generator.

Embodiments of the present invention may relate to a device that circulates a heat transfer fluid (or material) into geomagnetic areas of the earth, be they near the surface or deep below the surface in order to transfer the heat to any device to produce a variety of results. This device may be called a compound thermal riser, which may attach to a device such as a geomagmatic energy providing device or Power Tube, such as described in U.S. Pat. No. 6,259,165, the subject matter of which is incorporated herein by reference. For example, U.S. Pat. No. 6,259,165 describes a Power Tube that may include a boiler module, a turbine module, a condenser module, a generator module and the thermal riser coupled together as a unitary assembly, for example.

Embodiments of the present invention may be referred to as a thermal riser, a compound thermal riser, and/or a compound thermal riser device, system and/or assembly. The compound Thermal Riser may circulate a heat exchange material that may be liquid, mineral and/or flowing compound that when heated as it flows downward through a geomagmatic picks up the heat of the zone and returns the heat exchange material to the top of the Power Tube heat exchanger (boiler) allowing the heat of the material to pass the heat into the heat exchanger materials that become a gas, and the gas may drive a turbine connected to a generator through the Monocoque turbo-generator section 20.

U.S. Pat. No. 6,259,165 may include embodiments that relate to a below-the-surface power generating device (i.e., a Power Tube device) that may convert heat energy of the Earth to electrical energy. One factor for this type of energy generating (or producing/providing) device and/or other types of energy generating devices may be the transfer of the thermal energy from the geomagmatic resource via heat transfer material through the compound thermal riser in order to accomplish transfer of heat energy to the heat exchanger that contains the material that when heated, may convert to vapor and drive the turbine in the Monocoque turbo-generator of the Power Tube. The compound thermal riser may be installed vertically, in parallel systems and/or formations that may follow geometry of the geomagmatic resource hole.

Further, joints, partitions, seals, attached instrumentation may be designed to not leak. They may be welded onto the unit. The joining portions of each segment may interface with special seals that are designed to fit within a clamping, beveled joining flange with pressure maintained by tightening of one pipe segment to another pipe segment. The materials used for the heat transfer material may be non-toxic, and biodegradable.

The design of the compound thermal riser may be such that it may oscillate with any seismic movement, and the oscillation may be monitored by a programmable logic controller.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A device comprising:
   a tubular heat exchanger section to provide a biodegradable heat exchange oil, the tubular heat exchanger section having a first end and a second end; and
   a thermal riser having a first end and a second end, the first end of the thermal riser being attached to the second end of the tubular heat exchanger section, the thermal riser to receive the heat exchange oil from the tubular heat exchanger section and to heat the heat exchange oil based on a resource, wherein the thermal riser includes a thermal riser pump and a thermal riser pump housing to house a heat transfer pump, a plurality of thermal riser sensors and a plurality of thermal riser sections, wherein a first one of the thermal riser sections is coupled to a second one of the thermal riser sections, and the first thermal riser section includes:
   a first outer spiral pipe section to circulate the heat exchange oil in a downward manner, and
   a first inner return pipe section provided inside the first outer spiral pipe section to receive the heat exchange oil after the heat exchange oil passes through the first outer spiral pipe section, wherein the first inner return pipe section provides heated heat exchange oil, wherein at least one of the sensors provides an indication of temperature of the heated heat exchange oil, and wherein the heat transfer pump in the thermal riser adjusts a speed based on the temperature of the heated heat exchange oil.

2. The device of claim 1, wherein the thermal riser further includes a thermal riser coaxial section having an outer area for providing the heat exchange oil to the first outer spiral pipe section, and an inner pipe for receiving the heat exchange oil from the first inner return pipe section.

3. The device of claim 2, wherein the thermal riser further includes a thermal riser transitional section to transition from a coaxial system on an upper side coupled to the thermal riser coaxial section to a spiral system on a lower side.

4. The device of claim 1, wherein the heat transfer pump circulates the heat transfer oil based on at least the temperature of the heated heat exchange oil.

5. The device of claim 4, wherein the plurality of sensors further sense flow of the heat exchange oil.

6. The device of claim 5, wherein a speed of the heat transfer pump is further adjusted based on the sensed flow of the heat exchange oil.

7. The device of claim 1, wherein the heat transfer oil flows through a dual dichotomized venturi system at an area where the first outer spiral pipe section couples to the first inner return pipe section.

8. The device of claim 1, further comprising a turbine or a generator to provide electrical energy based on the heated heat exchange oil.

9. The device of claim 1, wherein the second thermal riser section includes:
   a second outer spiral pipe section to circulate the heat exchange oil from the first outer spiral pipe section in a downward manner, and
   a second inner return pipe section provided inside the second outer spiral pipe section to receive the heat exchange oil after the heat exchange material oil passes through the second spiral pipe section, and the second return pipe section to provide the heat exchange oil to the first inner return pipe section.

10. A device comprising:
a tubular heat exchange device to provide a heat exchange material, the tubular heat exchange device extending in a first direction from a first tubular end to a second tubular end; and
a tubular thermal riser that extends in the first direction from a first tubular end to a second tubular end, the second tubular end of the tubular heat exchange device to couple to the first tubular end of the tubular thermal riser, the tubular thermal riser including a heat transfer pump to circulate the heat transfer material, a plurality of sensors, and a plurality of thermal riser sections, the heat transfer pump provided at the first tubular end of the tubular thermal riser, the tubular thermal riser to heat the heat exchange material received from the tubular heat exchange device based on a down-hole resource,
wherein a first one of the thermal riser sections is coupled to a second one of the thermal riser sections, and the first thermal riser section includes a first inner pipe section and a first spiral pipe section provided outside the first inner pipe section, the first spiral pipe section to downwardly provide the heat exchange material, and the first inner pipe section to upwardly provide the heat exchange material, wherein the tubular heat exchange device includes a turbine or generator device to provide electrical energy based on the heated heat exchange material received from the tubular thermal riser,
wherein at least one of the sensors provides an indication of temperature of the heated heat exchange material, and the heat transfer pump in the tubular thermal riser adjusts a speed based on the indication of the temperature.

11. The device of claim 10, wherein the tubular thermal riser further includes a thermal riser coaxial section having an outer area for providing the heat exchange material to the first spiral pipe section, and an inner pipe section for receiving the heat exchange material from the first inner pipe section.

12. The device of claim 11, wherein the tubular thermal riser further includes a thermal riser transitional section to transition from a coaxial system on an upper side coupled to the thermal riser coaxial section to a spiral system on a lower side.

13. The device of claim 10, wherein the heat transfer pump circulates the heat transfer material based on at least the temperature of the heated heat exchange material.

14. The device of claim 13, wherein the plurality of sensors further sense flow of the heat exchange material.

15. The device of claim 14, wherein a speed of the heat transfer pump is further adjusted based on the sensed flow of the heat exchange material.

16. The device of claim 10, wherein the heat transfer material flows through a dual dichotomized venturi system at an area where the first spiral pipe section couples to the first inner pipe section.

17. The device of claim 10, wherein the heat exchange material is oil.

18. The device of claim 10, wherein the second thermal riser section includes:
a second outer spiral pipe section to circulate the heat exchange material from the first outer spiral pipe section in a downward manner, and
a second inner return pipe section provided inside the second outer spiral pipe section to receive the heat exchange material after the heat exchange material passes through the second spiral pipe section, and the second inner return pipe section to provide the heat exchange material to the first inner return pipe section.

19. A device comprising:
a heat exchanger section to provide a heat exchange material, the heat exchanger section extending in a tubular manner from a first end to a second end, and
a thermal riser having a first end to connect to the second end of the heat exchanger section, the thermal riser to receive the heat exchange material from the heat exchanger section and to heat the heat exchange material based on a resource, wherein the thermal riser includes:
a heat transfer pump at the first end of the thermal riser,
a plurality of thermal riser sensors;
an outer spiral pipe section to circulate the heat exchange material in a downward manner, and
an inner return pipe section provided inside the outer spiral pipe section to receive the heat exchange material from the outer spiral pipe section after passing through the outer spiral pipe section,
wherein the thermal riser includes a thermal riser coaxial section having an outer area for providing the heat exchange material to the outer spiral pipe, and an inner pipe section for receiving the heat exchange material from the inner return pipe, and
wherein at least one of the sensors provides an indication of temperature of the heated heat exchange material, and wherein the heat transfer pump in the thermal riser adjusts a speed based on the temperature of the heated heat exchange material.

* * * * *